United States Patent [19]

Dicks

[11] 3,997,317
[45] Dec. 14, 1976

[54] GLASS ANNEALING LEHR HAVING GAS AND ELECTRIC HEATING MEANS

[75] Inventor: Charles E. Dicks, Uniontown, Pa.

[73] Assignee: E. W. Bowman Incorporated, Uniontown, Pa.

[22] Filed: Mar. 24, 1975

[21] Appl. No.: 561,433

[52] U.S. Cl. .............................. 65/350; 65/351; 432/145; 432/149; 432/150

[51] Int. Cl.$^2$ ..................................... C03B 25/04

[58] Field of Search ............ 65/348, 389, 350, 351; 432/144, 145, 149, 150; 13/2

[56] References Cited

UNITED STATES PATENTS

| | | | |
|---|---|---|---|
| 2,544,947 | 3/1951 | Baker | 65/351 X |
| 2,637,754 | 5/1953 | Shaw et al. | 13/2 X |
| 3,261,596 | 7/1966 | Bowman | 432/144 X |

FOREIGN PATENTS OR APPLICATIONS

| | | | |
|---|---|---|---|
| 1,062,400 | 7/1959 | Germany | 65/348 |

OTHER PUBLICATIONS

Letter of Apr. 21, 1975 to Mr. Jaspert from Mr. Jeffery, Letter of Sept. 4, 1975 of Mr. Jeffery to "Office of the Solicitor".

*Primary Examiner*—Arthur D. Kellogg
*Attorney, Agent, or Firm*—Donald D. Jeffery

[57] ABSTRACT

This disclosure relates to glass annealing lehrs in which glass ware is supported on an endless conveyor to convey it through a closed tunnel consisting of separately controllable temperature zones which expose the ware to a glass annealing temperature gradient produced and maintained by gaseous fuel burners and electrical heaters employed separately or jointly, depending upon the availability of the fuel or electrical energy. In accordance with the invention, circulating fans are positioned at both sides of each lehr section, and air inlet ducts are provided for admitting controlled amounts of ambient air to the inlet of each fan.

4 Claims, 7 Drawing Figures

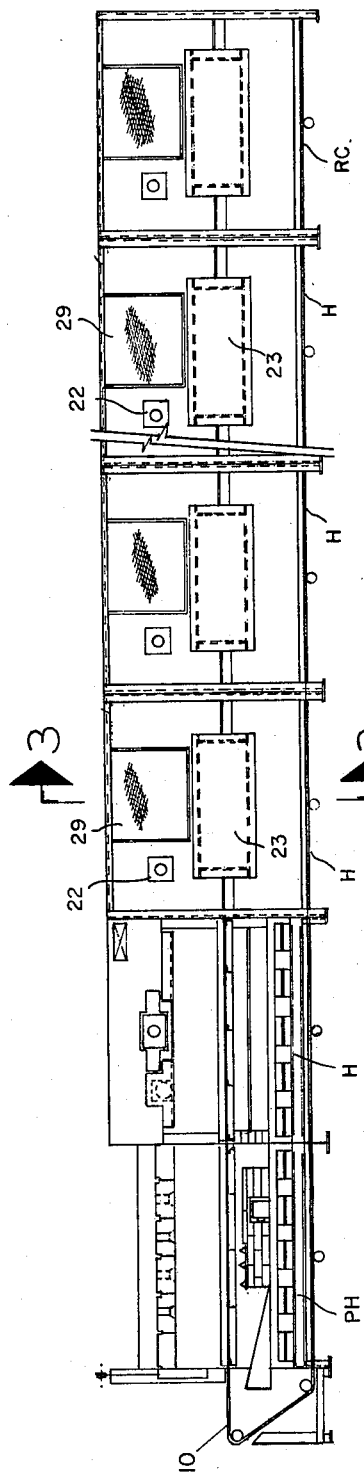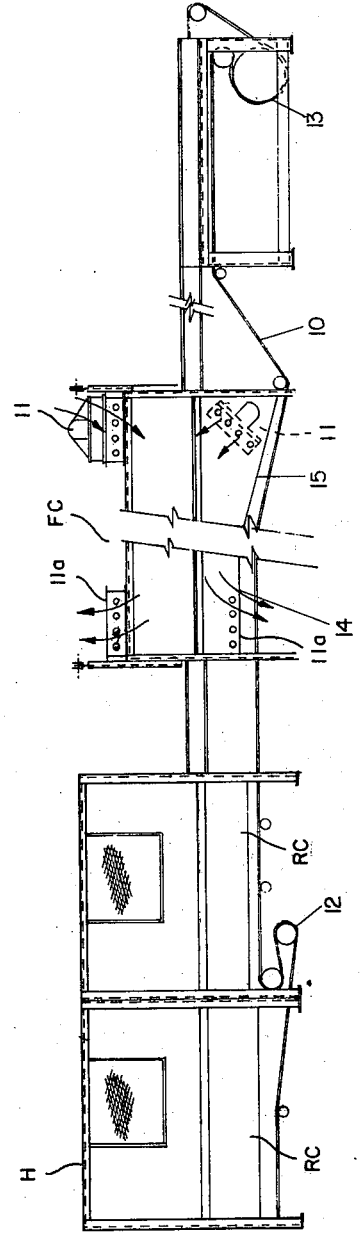

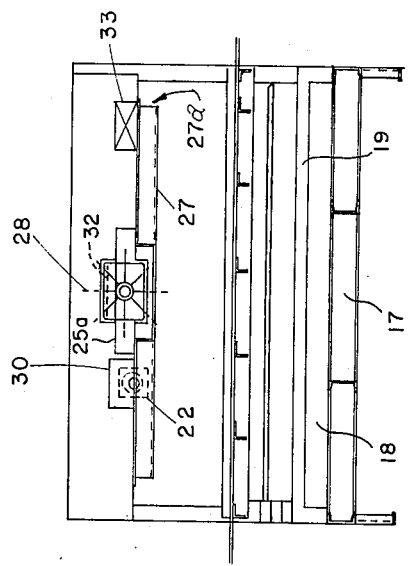
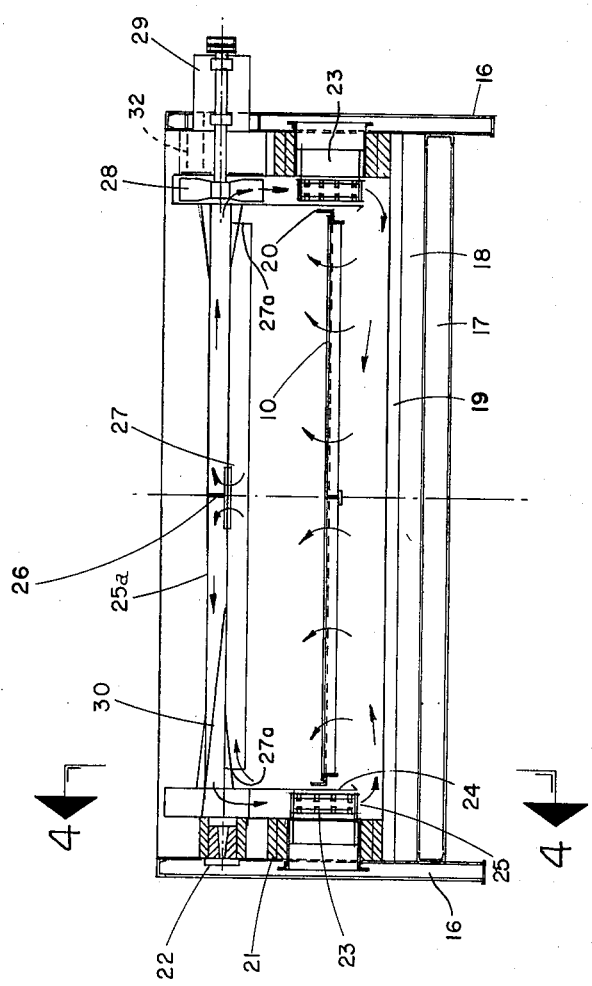
FIG. 4
FIG. 3

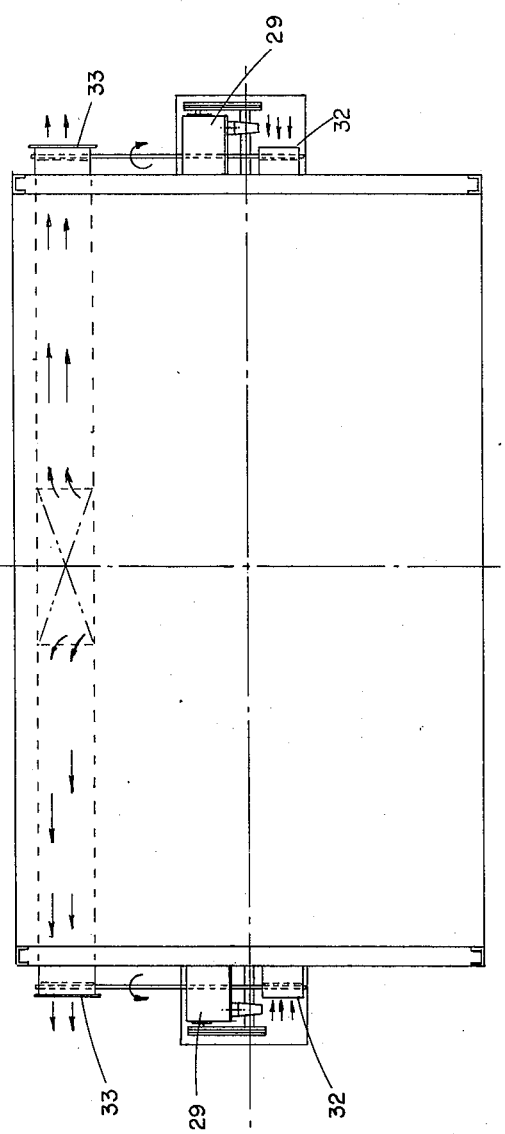

3,997,317

GLASS ANNEALING LEHR HAVING GAS AND ELECTRIC HEATING MEANS

SUMMARY OF THE INVENTION

The annealing lehr constructed in accordance with the present invention has gas burners and electric heating elements at opposite sides of the lehr which is further provided with ducts to direct the heating medium, normally air, to an area below the conveyor and thence upwardly therethrough for heating the ware. The invention includes means for recirculating the heating medium, and for adding controlled amounts of ambient air.

The principle object of the present invention is to provide an annealing lehr in which gas burners and electric heating panels are arranged in the normal path of circulation of the treating medium whereby heating energy in the form of either gas or electric heat, or both, is available for joint or alternative use, depending upon the availability of both forms of energy.

A further object of the invention is to provide a glass annealing lehr in which the heating medium is uniformly applied to the ware by means of ducts at opposite sides of the lehr conveyor in which ducts circulating fans are mounted, with the heating medium being directed and recirculated by the fans in a manner to consume minimum heat energy which makes the use of electrical energy practical. Air inlet ducts are provided for each fan and communicate controlled amounts of ambient air to the fan inlets. The introduction of ambient air to the fan inlet, which is at negative pressure, avoids interfering with the air circulation in the lehr whereby turbulence is avoided and uniform heating of the ware assured. In accordance with the invention, air inlet ducts are mounted in the side wall of each lehr section and are provided with adjustable dampers to control the ambient air supply to the fan inlet. An exhaust vent communicates with the treating chamber for controlled exhaust of air from the chamber.

A further and important object of the invention is to provide a lehr with a circulation system constructed so as to substantially reduce the headroom or overall height of the lehr so as to permit use of the lehr in relatively confined areas. In accordance with one form of the invention, the recirculating air intake and exhaust equipment is mounted on the sides of the lehr sections rather than on the top, and ambient air supply is provided at the inlet of each fan.

These and other objects of the invention will become more apparent as the following description proceeds in particular reference to the application drawings.

BRIEF DESCRIPTION OF THE DRAWINGS

In the accompanying drawings,

FIG. 1 is a side elevational view diagrammatically, partially broken, illustrating a glass annealing lehr constructed in accordance with the present invention having one preheat, four heating chambers and one recirculating cooling chamber;

FIG. 2 is a view diagrammatically illustrating two recirculating cooling chambers and a fast cooling chamber together with a drive drum and inspection table, FIG. 2 extending from the right hand end of FIG. 1, with FIGS. 1 and 2 together constituting the entire length of the lehr;

FIG. 3 is a cross-sectional view of the lehr taken generally along the line 3—3, FIG. 1;

FIG. 4 is a diagrammatic view of a section taken along the line 4—4, FIG. 3;

DETAILED DESCRIPTION OF THE PREFERRED EMBODIMENTS

Figure 7:
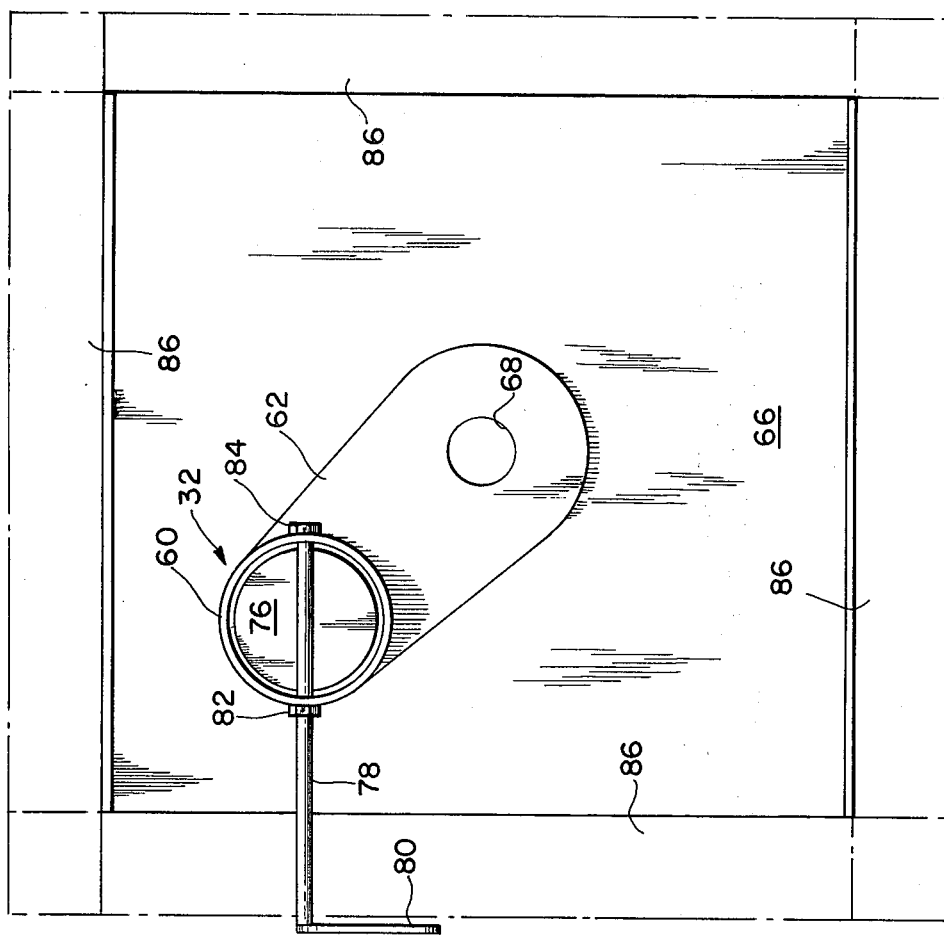
FIG. 7 is an end view of FIG. 6, looking from the right end thereof.

With reference initially to FIGS. 1 and 2, the lehr is constructed of modules or sections that are arranged in series to constitute an endless tunnel through which a lehr conveyor belt 10 passes to support the ware, which may be bottles or other glass items to be annealed, such as tumblers and the like. The conveyor belt 10 is perforated to permit passage of the treating medium upwardly therethrough and over the ware traveling through the lehr.

The lehr belt 10 is shown passing through a preheating chamber PH at the charging end of the lehr and through heating sections H, there being four such sections shown in FIG. 1, although more could be employed, and through recirculating cooling sections RC, which are three in number in FIGS. 1 and 2, although more could be employed if conditions require. The recirculating cooling sections RC are provided with the same recirculating system as will be presently described with particular reference to FIG. 3, which comprises a section through one of the heating sections H. In usual practice, no heat is applied to the ware in the recirculating cooling sections RC, with the cooling of the ware being effected by the circulating ambient air. After passing through the last section RC, the ware is conveyed to a fast cooling section FC in which are mounted louvered fan units commonly designated at 11 for drawing ambient air into the cooling sections, with exhaust dampers 11a, being provided to control the egress of treating gas from the fast cooling sections FC. It should be noted that the fast cooling section FC per se forms no part of the present invention, with the same being disclosed and claimed in U.S. Pat. No. 3,371,430 to Edward W. Bowman granted Mar. 5, 1968.

The conveyor belt 10 is entrained around an idler pulley at the charging end of the lehr and around drive drum 13, FIG. 2, at the discharge end of the lehr, and thereafter around tension device 12, FIG. 2, the adjustment of which affords proper tensioning of the belt.

With reference to FIGS. 3 and 4, the lehr sections are mounted on buck stays 16 at the sides of the lehr. Cross members 17 extend between the stays 16, and insulating material 18 and 19 is mounted on and supported by the cross members. Z-shaped channels 20 support the conveyor belt 10. Insulated walls made of firebrick 21 are supported at the sides of the lehr inwardly of the stays 16, and a burner block 22 and an electric heating panel 23 are mounted in openings formed in the insulated walls at both sides of each heating section H of the lehr. Firebrick 21 could be replaced by steel lining and filling with mineral wool. Each electric heating panel 23 comprises, for example, electric resistance elements or the like, and is disposed in a vertical flue or duct 24 which is open at the bottom at 25 and which communicates adjacent the top thereof with a circulating duct 25a. The latter has a central opening that communicates with a return circulation duct 27, a partition 26 being positioned in the duct 25a to divide the flow from the recirculation duct 27 into the duct 25a.

A fan 28 driven by motor 29 is mounted in the duct 24, the fan 28 setting up a circulatory path to conduct the treating gases or medium into the treating chamber, as shown by arrows in FIG. 3. Thus, the fan 28 directs the heating medium downwardly through the duct 24 in which it is mounted, past the electric heating panel 23 to the area below the conveyor belt and thence upwardly through the foraminous belt for heat exchange contact with the ware travelling on the conveyor. The treating gases then are directed into the opposite, open ends of the recirculating duct 27, through the central opening in the duct 25a and then in opposite directions therethrough, due to the partition 26, thereby completing the circuit. Although only one burner 22 and fan 28 are shown in the heating section illustrated in FIG. 3, it will be understood that a fan is provided at each side of the lehr section, with gas burners 22 likewise being provided at each side, offset laterally from the fans, as shown in FIG. 4. FIG. 3 is actually taken on two vertical, offset planes through FIG. 1, with the dashed line running vertically through the center of FIG. 3 separating the planes. If the two planes were extended fully across, the additional structure in each instance would be a mirror image of the section shown. A metal scoop or shield 30 directs the flame from the burner 22 into the recirculating duct 27, with the latter being formed with openings in the top wall thereof through which the burner gases can enter the duct. The hot burner gases then pass through ducts 27 and 25a prior to passage downwardly through the ducts 24.

Air inlet ducts 32 and an exhaust vent 33 are provided and are shown schematically or in dashed lines in FIGS. 3 and 4. Each inlet duct 32 communicates with the circulating duct 25a through the fan inlet and the exhaust vent 33 communicates directly with the treating chamber at one end of the recirculating duct 27. The inlet ducts 32 and exhaust vents 33 are preferably provided with damper means to control the ambient air entering the lehr and the gases exhausted therefrom, as will be hereinafter described when particular reference is made to FIGS. 6 and 7.

It will be noted that the recirculating duct 27 is open at its ends 27a to provide flow communication with the treating chamber, and that the flow of the annealing medium or gases is downwardly around the burners 22 and over panels 23 towards the center of the lehr, thereby providing uniform heat distribution.

It will also be noted that by virtue of mounting the circulation equipment at the sides of the lehr, a substantial savings in headroom results thereby adapting the system to confined areas not otherwise able to handle lehr systems of this general type with heretofore existing height limitations.

Referring to FIG. 5, which is a plan view of the heating section shown in FIGS. 3 and 4, the inlet ducts 32, located at both sides of the lehr section, are provided with dampers 32a which are mounted on rods 32b the opposite ends of which have mounted thereon dampers 33a positioned in the ends of exhaust vent 33. Although not seen in FIG. 5, the inlet ducts communicate with the negative pressure side of the fans whereby turbulence is avoided. The preferred form of inlet duct construction and mounting is shown in more detail in FIGS. 6 and 7, specifically referred to hereinbelow.

Rotation of the rods 32b as indicated by the arrows serves to rotatably adjust the dampers 32a and 33a so as to control the ingress of ambient air to the treating chamber through the inlet ducts 32 and the egress of the treating gas from the treating chamber through the exhaust vent 33. The rods 32b can be manually controlled but are preferably automatically controlled through temperature responsive devices (not shown) positioned in the treating chamber, which actuate a motor (not shown) for rotating the rods 32b in the proper direction to effect the desired result. Although the dampers 32a and 33a are shown actuated simultaneously, it will be apparent that separate controls could be employed.

The exhaust vent 33 includes two laterally extending sections 33b and 33c which communicate at their inner ends with a vertical exhaust duct 33d the bottom of which opens directly into the treating chamber for gas exhaust therefrom. It will be understood that the treating gas not exhausted from the unit through the exhaust vent 33 will be recirculated through the recirculating duct 25a and the vertical ducts 24 as above described.

The circulating system shown in FIGS. 3–5 also forms part of the recirculating cooling sections RC and functions similarly to control the ingress of ambient air to the cooling sections and the exhaust of air from the cooling sections, with the damper adjustment preferably being automatically controlled as just described for providing optimum cooling effect on the ware in the cooling sections.

Figure 6:
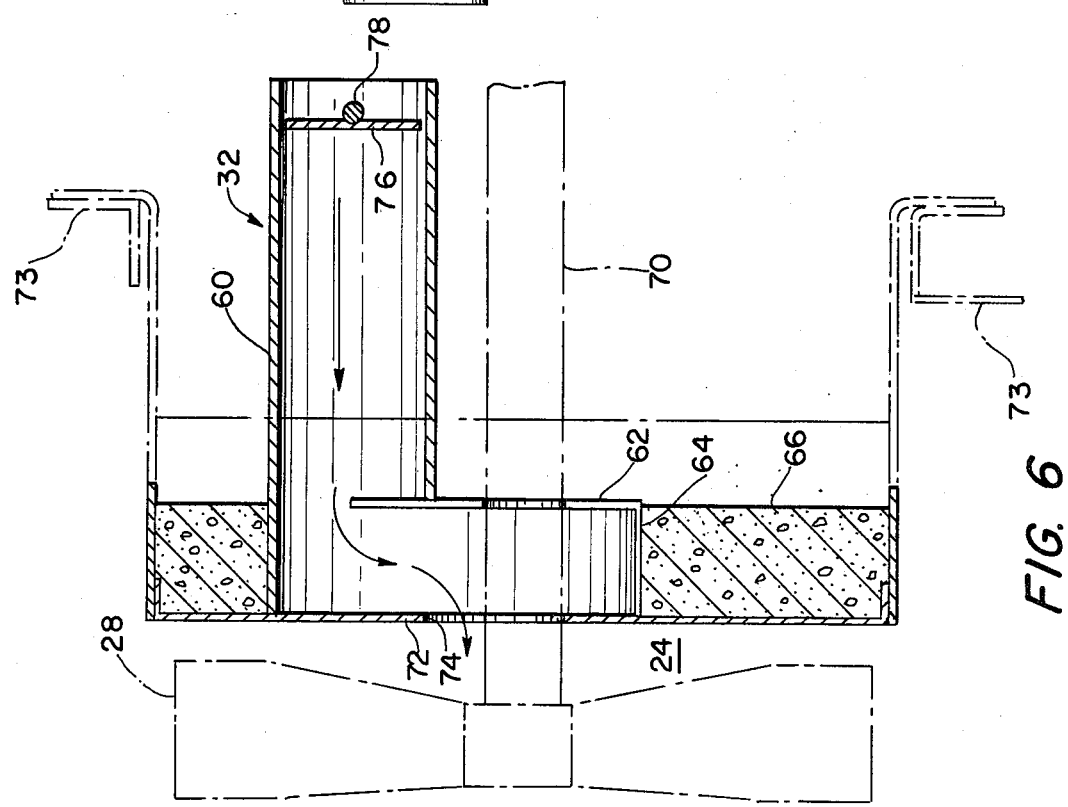
FIG. 6 is a vertical sectional view, partially fragmented, showing the ambient air inlet duct for the fan of the lehr of FIGS. 3 and 4.

Referring to FIGS. 6 and 7, there is illustrated therein in greater detail the preferred form of air inlet duct 32 for admitting ambient air into the inlet of the fan 28. As noted above, it is necessary to admit ambient air at negative pressure in order not to disrupt the circulating air flow through the lehr, a consequence of which would be the creation of turbulence and non-uniform heating of the ware traveling through the lehr.

The air inlet duct 32 in FIGS. 6 and 7 comprises a generally cylindrical portion 60 which extends exteriorly of the lehr and an inner, mounting portion 62 which is mounted in an opening 64 therefor provided in the wall portion 66 of the lehr. As can be seen in FIG. 7 the mounting portion 62 is generally elliptical in shape and formed with an opening 68 adjacent to the bottom thereof for receiving the shaft 70 of the fan 28 for supporting the fan in the duct 24. The thickness of the mounting portion 62 of the duct generally corresponds to the thickness of the wall portion 66 of the lehr, and the innermost wall 72 of the duct is formed with an opening 74 through which the ambient air can flow to the inlet of the fan, as shown by arrows in FIG. 6. It should be noted that the entire thickness of the wall extends to the flanges 73 shown in dashed lines, but only the wall portion 66 has been illustrated in FIG. 6 for sake of clarity.

Positioned near the outlet end of the duct 32 is a damper 76 which is generally circular and slightly less in diameter than the inner diameter of the duct, with the damper being carried by damper rod 78 which extends through the duct as shown in FIG. 7. The rod 78 extends to one side of the inlet duct and integrally secured to the end of the rod is a control handle 80 to permit manual adjustment of the damper for opening and closing the same, or adjusting the damper to positions between opened and closed. The section of the rod 78 which extends through the inlet duct is threaded and retaining nuts 82 and 84 are provided to maintain the rod in the position thereof shown in FIG. 7 and to secure the rod against rotation when the rod is in the desired position of rotation depending upon the preferred orientation of the damper 76. In FIG. 7, the wall section 66 is shown circumscribed by frame members commonly designated at 86 which comprise part of the wall structure for the lehr and form no part of the present invention.

It will thus be seen that the amount of ambient air admitted to the lehr at the inlet side of the fan 28 can be manually adjusted through movement of the damper 76 by the control rod 78 and handle 80. In the FIG. 6 position of the damper 76, ambient air flow to the lehr is substantially shut off, and the damper 76 can be adjusted from such position to partially or entirely open positions in a well known manner. The supply of ambient air to a point of negative pressure at the inlet side of the fan 28 permits the ambient air to be supplied to the lehr without in any way disrupting the air circulation within the lehr which is an important consideration as above noted. Although FIGS. 6 and 7 represent ambient air supply and control for a single fan 28, it will be understood that air inlet ducts are provided for all of the fans in the FIG. 3 form of the invention. It will also be understood that the damper 76 can be automatically controlled by temperature responsive devices positioned in the treating chamber, as disclosed above in the description of FIG. 5. The introduction of ambient air as shown in FIGS. 6 and 7 can be provided as well in the recirculating cooling sections RC.

The efficient application of heat and the recirculation of the treating medium in accordance with the invention provides for efficient use of the fuel or electrical energy so that a minimal amount of energy is required in the operation of the lehr. Because of this, use of electrical heating panels is feasible but in operation it is apparent that either the gaseous fuel heaters or the electrical heating panels or both may be used if necessary or desirable. It has been recently experienced that gaseous fuels or electrical energy is not always available in the amounts needed and heretofore available, and where either or both of these are in short supply it may be desirable to operate both the fuel and electrical heating devices at reduced consumption levels for both. The introduction of ambient air at the inlets of the fans permits air to be added as desired without adversely affecting the efficient air circulation through the fan. The mounting of the fans at the sides of the lehr has the important advantage of substantially reducing the total height of the lehr, with the resulting low profile lehr permitting installation in certain environments where head room is a vital concern.

Although preferred embodiments of the invention have been herein illustrated and described, it will be evident to those skilled in the art that various modifications may be made in the details of construction without departing from the principles herein set forth.

I claim:

1. In a glass annealing furnace, the combination comprising a plurality of tunnel shaped lehr heating sections serially arranged to constitute an elongated heating chamber, a perforated endless conveyor movable longitudinally through said lehr for supporting the ware to be annealed, each of said heating sections having air circulation and recirculation ducts above said conveyor and communicating with vertical ducts at opposite sides of the heating sections, gas burner means disposed adjacent to said vertical ducts, fan means positioned in each of said vertical ducts for directing air downwardly through said vertical ducts around said gas burner means to an area below said conveyor, the heated air being thereafter directed upwardly through said conveyor and over said ware, into said recirculation duct and thereafter to said circulation duct for recirculating passage to said vertical ducts, an exhaust vent communicating with said heating chamber and provided with damper means for controlling the exhaust of air from said treatment chamber, air inlet means mounted in each side wall of said heating section and communicating with the inlet of said fan means for supplying ambient air to the heating chamber, each of said air inlet means including a generally cylindrical portion open at the outer end thereof for receiving ambient air and an inner mounting portion positioned in an opening in said side wall, the mounting portion being formed with openings through which the shaft of said fan means can pass, said cylindrical portion having mounted therein an adjustable damper means.

2. The combination of claim 1, further including means interconnecting said damper means of said exhaust vent and said damper means of said air inlet means for simultaneous adjustment.

3. In a glass annealing furnace, the combination comprising a plurality of tunnel shaped lehr heating sections serially arranged to constitute an elongated heating chamber, a perforated endless conveyor movable longitudinally through said lehr for supporting the ware to be annealed, each of said heating sections having air circulation and recirculation ducts above said conveyor and communicating with vertical ducts at opposite sides of the heating sections, electrical heating means disposed in said vertical ducts, fan means positioned in each of said vertical ducts above said electrical heating means for directing air downwardly through said vertical ducts over said electrical heating means to an area below said conveyor, the heated air being thereafter directed upwardly through said conveyor and over said ware, into said recirculation duct and thereafter to said circulation duct for recirculating passage to said vertical ducts, an exhaust vent communicating with said heating chamber and provided with damper means for controlling the exhaust of air from said treatment chamber, air inlet means mounted in each side wall of said heating section and communicating with the inlet of said fan means for supplying ambient air to the heating chamber, each of said air inlet means including a generally cylindrical portion open at the outer end thereof for receiving ambient air and an inner mounting portion positioned in an opening in said side wall, the mounting portion being formed with openings through which the shaft of said fan means can pass, said cylindrical portion having mounted therein an adjustable damper means.

4. The combination of claim 3 further including means interconnecting said damper means of said exhaust vent and said damper means of air inlet means for simultaneous adjustment.

* * * * *